United States Patent
Kennedy

(10) Patent No.: US 8,010,050 B2
(45) Date of Patent: Aug. 30, 2011

(54) METHOD AND SYSTEM FOR WIRELESS ACCESS TO A NETWORK BY AN ISOLATED USER

(75) Inventor: Irwin O. Kennedy, Londonderry (GB)

(73) Assignee: Alcatel Lucent, Paris (FR)

( * ) Notice: Subject to any disclaimer, the term of this patent is extended or adjusted under 35 U.S.C. 154(b) by 1283 days.

(21) Appl. No.: 11/541,133

(22) Filed: Sep. 28, 2006

(65) Prior Publication Data

US 2008/0081652 A1   Apr. 3, 2008

(51) Int. Cl.
*H04B 1/00* (2006.01)
*H04B 15/00* (2006.01)

(52) U.S. Cl. .............. 455/63.1; 455/422.1; 455/434; 455/515

(58) Field of Classification Search ........... 455/63.1, 455/422.1, 434, 515, 517, 519
See application file for complete search history.

(56) References Cited

U.S. PATENT DOCUMENTS

| | | | |
|---|---|---|---|
| 7,020,701 B1 * | 3/2006 | Gelvin et al. ............ | 709/224 |
| 7,085,535 B2 * | 8/2006 | Goto et al. ................. | 455/63.1 |
| 7,400,903 B2 * | 7/2008 | Shoemake et al. ......... | 455/552.1 |
| 7,424,268 B2 * | 9/2008 | Diener et al. ............... | 455/62 |
| 2006/0030318 A1 | 2/2006 | Moore et al. ................. | 455/434 |
| 2006/0083205 A1 * | 4/2006 | Buddhikot et al. ......... | 370/338 |
| 2006/0094456 A1 | 5/2006 | Rittle et al. ................. | 455/519 |

FOREIGN PATENT DOCUMENTS

| WO | WO 2005/067264 | 7/2005 |
|---|---|---|
| WO | WO 2006/082379 | 8/2006 |
| WO | PCT/US2007/020566 | 2/2008 |

OTHER PUBLICATIONS

Brodersen et al., "CORVUS: A Cognitive Radio Approach for Usage of Virtual Unlicensed Spectrum", University of Berkeley. Jul. 29, 2004, pp. 1-21.

* cited by examiner

*Primary Examiner* — Tuan H Nguyen
(74) *Attorney, Agent, or Firm* — Martin I. Finston

(57) ABSTRACT

Wireless access to a network 2 by an isolated user 1 includes the isolated user 1 transmitting a wireless signal intended to produce interference at nodes included in a group 3, 4 and 9 of nodes, that have access to the network 2. Upon the interference being detected by a member of one of the groups, and a link established between the isolated user 1 and the member of the group, access to the network 2 is arranged for the isolated user 1. In one method, the isolated user is unlicensed and seeks access to the network via a licensed part of the wireless spectrum.

24 Claims, 3 Drawing Sheets

METHOD AND SYSTEM FOR WIRELESS ACCESS TO A NETWORK BY AN ISOLATED USER

FIELD OF THE INVENTION

The present invention relates to a method and system for wireless access to a network by an isolated user, and more particularly, but not exclusively, to opportunistic access to a licensed part of the radio spectrum by a non-licensed user.

BACKGROUND OF THE INVENTION

Much of the wireless spectrum is licensed by governments or otherwise allocated to particular services or users. It might thus appear that the allocated parts of the spectrum are unavailable to others as they are already occupied. However, in practice, there is often available capacity because the allocated bands are not always fully used by licensed services.

It has been proposed to make more efficient use of the wireless spectrum by including some intelligence in the communicating devices to enable in-use and unused communication channels to be identified, and then an unoccupied one to be selected accordingly for a communications session. This could be particularly beneficial if applied so as to allow unlicensed users to make use of unoccupied licensed channels, providing this does not interfere with licensed usage, which should have priority. This type of approach is described in the white paper "CORVUS: A Cognitive Radio Approach for Usage of Virtual Unlicensed Spectrum", Jul. 29, 2004, by Brodersen et al, University of Berkley, which is incorporated herein by reference. The concept of using intelligence in communicating devices is known as "cognitive radio". One definition of cognitive radio has been given by Joseph Mitola as follows: "The term cognitive radio identifies the point in which wireless personal digital assistants (PDAs) and the related networks are sufficiently computationally intelligent about radio resources and related computer-to-computer communications to: (a) detect user communications needs as a function of use context, and (b) to provide radio resources and wireless services most appropriate to those needs."

Where a user wishes to have access to a network in a cognitive radio environment, there must be a mechanism for making the user's presence known. One proposed method for user discovery suggests using the infrastructure of an existing underlay network, such as a cellular radio access network, which provides extensive coverage over a geographic region. A user retrieves information via the underlay network to enable it to identify and achieve access to a local node, for example, which enables connection to another network. For example, a centralised database provided by the cellular network provider could be accessed via Internet Protocol (IP) messaging. While this proposal would make good use of existing legacy infrastructure, such a solution is not the most spectrally efficient, and cost effective, long-term solution.

In another method, it is suggested that a globally reserved radio band be made available as a conduit for user discovery protocols. The combination of protocols and the global radio band would enable a new user to be discovered. However, the reservation of radio spectrum for the purpose of user discovery is inherently inefficient. It requires the bandwidth to be globally reserved both spatially and temporally. Also, it would require spectrum regulatory bodies to reach international agreement on reserving a frequency band. Furthermore, it would add an unnecessary requirement on modern architectures to support the universally defined radio band.

BRIEF SUMMARY OF THE INVENTION

According to an aspect of the invention, a method for wireless access to a network by an isolated user includes the isolated user transmitting a wireless signal intended to produce interference at an unknown node. When the interference is detected by the unknown node, access to the network is arranged for the isolated user. The network may be the Internet, or some other network, for example, a sensor network. A node may be a network element, in a local area network, for example, or a mobile user terminal, say.

In a method in accordance with the invention, the unknown node may be a member of a group of nodes, at least one member of the group having access to the network. The group of nodes having access to the network may include only one node. Alternatively, it may include a plurality of nodes, which may be interconnected.

In another method in accordance with the invention, the isolated node and the unknown node together define the network, the network being defined subsequent to the interference being detected by the unknown node.

In one method in accordance with the invention, discovery of an isolated user is provided, so that the user may then seek access to a network. The method is particularly suitable where the isolated user is a non-licensed user that wishes to take advantage of opportunistic access to a licensed part of the radio spectrum, but it may also be used in other circumstances where the licensed status of either or both of the isolated user and available spectrum is not significant. The node at which the signal is intended to produce interference is termed unknown, because the isolated user is unaware of its existence and does not send a signal to a specific node.

The method permits isolated user discovery where there is no a priori knowledge of existing communications or the location of other nodes. The isolated user, also termed an isolated node in this specification, transmits a signal to alert other nodes of its presence. If other nodes are communicating, the signature transmission may cause interference, alerting them to the presence of the isolated node or user. The interference may be detected by a node that is not involved in a current communication session but is in a listening mode.

The inventor has realized that it is not necessary to transmit information concerning frequency requirements or transmission power in order to achieve isolated user discovery. If an unknown node detects the interference and sends a response that the isolated user can detect, then, implicitly, a suitable frequency band is being used for the communication to be possible. Thus, there is no need to implement a specific receive and transmit radio chain simply for setting up communication. This is particularly important for applications that are extremely sensitive to cost, for example, sensor networks. Similarly, the isolated user will only receive a response to the interfering signal if the transmission level is sufficiently high for an unknown node to become aware of it. Thus, transmit power need not be fixed by a standard, say.

The signal may be transmitted at progressively higher transmission strengths. Hence, if there is no user discovery by a node because it is out of range for signals transmitted at a lower power by the isolated user, the signal may be re-transmitted at successively higher levels until a response is received from a node. This technique reduces interference by the signal at other nodes if there is a suitable node able to detect the user presence at a lower signal power. The signal may be a series of signal transmissions or a continuous signal.

The isolated user may be unconnected to any other users or nodes prior to user discovery using a method in accordance with the invention. However, the isolated user could alternatively be interconnected with another user or node, or several of them, and is still defined as an isolated user if it has no means of access to the network prior to user discovery using a method in accordance with the invention. The isolated user may be any device that is capable of transmitting the signal intended to interfere. For example, the isolated user could be a mobile user terminal or a fixed element included in part of a local network.

When the unknown node detects the interference, a first transitory link to the network may be established, and the subsequently another link to the network established that more closely meets the isolated user's requirements than the transitory link. Thus the transitory link may be used to facilitate the establishment of another link with certain desired characteristics. Multiple links may be set up simultaneously between the isolated user and a number of nodes, if several connection routes to the network are desirable to the isolated user's purposes, for example, to ensure a robust connection to the network.

In one method in accordance with the invention, the isolated user transmits the signal at varying frequency bands of its transmit band. The isolated user may repeatedly pass through its transmit band, transmitting a narrow band signal. In parallel with the transmission, or interleaved with a series of transmitted signals, the isolated user may listen for a response from a node. When such a response is received, a link is established between the isolated user and the responding node, facilitating access to the network for the isolated user.

In another method in accordance with the invention, the signal is directional. The direction may be fixed or steered. A directional signal localizes spatial interference and also may be useful where the isolated user wishes to establish a link with nodes in a particular spatial location.

A method in accordance with the invention may involve a combination of more than one of: power variation; frequency variation; and signal direction variation.

The signal transmitted by the isolated user may include information concerning the isolated user's receiver characteristics, and, when the unknown node detects the interference, the unknown node establishes the receiver characteristic information contained in the signal, the time of occurrence of the interference, and its frequency band, to enable it to respond to the isolated user. The signal may include an identifier related to the isolated user.

The signal may include modulation scheme information, for example, if communication with the isolated user is required to take place using BPSK, QPSK, 16 QAM or some other scheme.

The signal may include information identifying which multiple access schemes are available to the isolated user. For example, the isolated user may be capable of communicating using one or more of TDMA, CDMA, FDMA technology or some other suitable implementation.

In another method in accordance with the invention, at least one of a modulation scheme and a type of multiple access scheme is defined by a standard applicable to a system implementing the method. This information may additionally also be included in the transmitted signal.

In a method in accordance with the invention, upon detection of the interference by an unknown node, the unknown node requests a second unknown node to respond to the isolated user. The unknown nodes may be connected members of a group of nodes. Then a link is established between the isolated user and the second unknown node to facilitate access to the network.

If more than one unknown node, for example, in the same group of connected nodes or in different groups, detects the interference provided by the signal, a negotiation may be carried out to select a link to the network for the isolated user. The negotiation may take into account the isolated user's requirements and/or those of the nodes or the groups to which the nodes belong. The unknown nodes detecting the interference may co-ordinate their shared access of the isolated user's receive capacity via the network.

According to another aspect of the invention, a communications system comprises a plurality of groups of connected nodes, at least one member of each group having access to a common network. At least one member of each group includes a detector to detect interference arising from a signal transmitted by an isolated user requiring access to the network and to detect characteristics of the isolated user to enable a link to be established between the isolated user and the network.

BRIEF DESCRIPTION OF THE DRAWINGS

Some methods and embodiments in accordance with the present invention will now be described by way of example only, and with reference to the accompanying drawings, in which.

DETAILED DESCRIPTION

Figure 1:
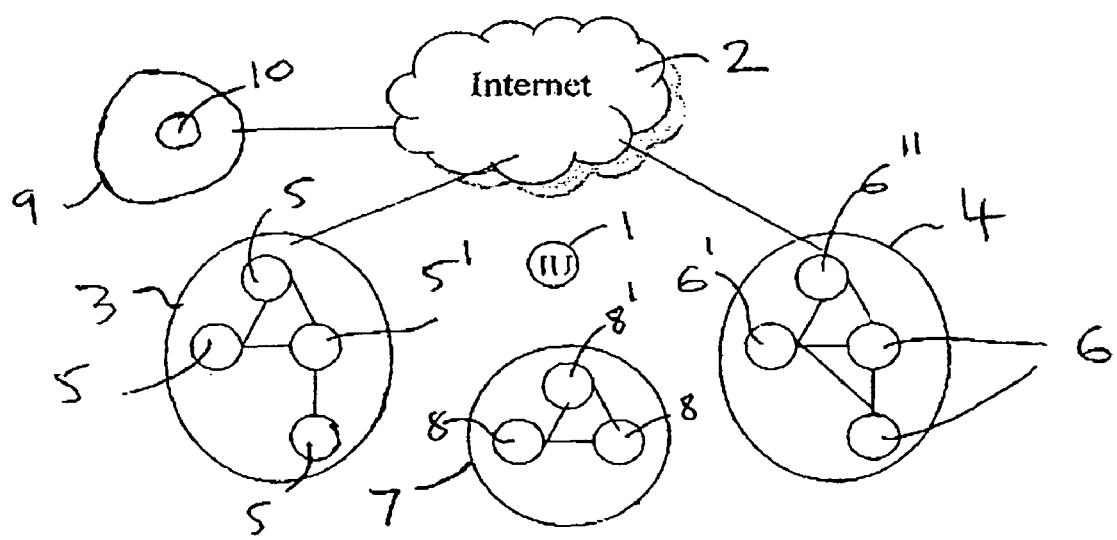
FIG. 1 schematically illustrates a communications system in accordance with the invention.

With reference to FIG. 1, an isolated user, or isolated node, 1 requires access to the Internet, represented at 2, but has no access to it. Additionally, the isolated node 1 has no a priori knowledge of any other existing node, or groups of connected nodes, and there is no global communication channel on which it might make contact with other nodes in an attempt to gain the required access.

Users tend to cluster into communicating groups or "bubbles". When a bubble has access to the Internet (IP) "cloud", it announces its presence via a shared database. The shared database is used for low speed purposes such as to aid in discovery for handover purposes, inter-bubble power-control feedback and channel use negotiation. When a bubble has no access to the IP cloud, its presence is unknown to other/users and it is termed "unannounced". In the system shown in FIG. 1, in addition to the isolated user 1, there are two announced bubbles 3 and 4, each of which includes a plurality of interconnected nodes 5 and 6 respectively, one unannounced bubble 7 which includes a plurality of interconnected users or nodes 8, and an announced bubble 9 that includes only a single user 10.

Figure 2:
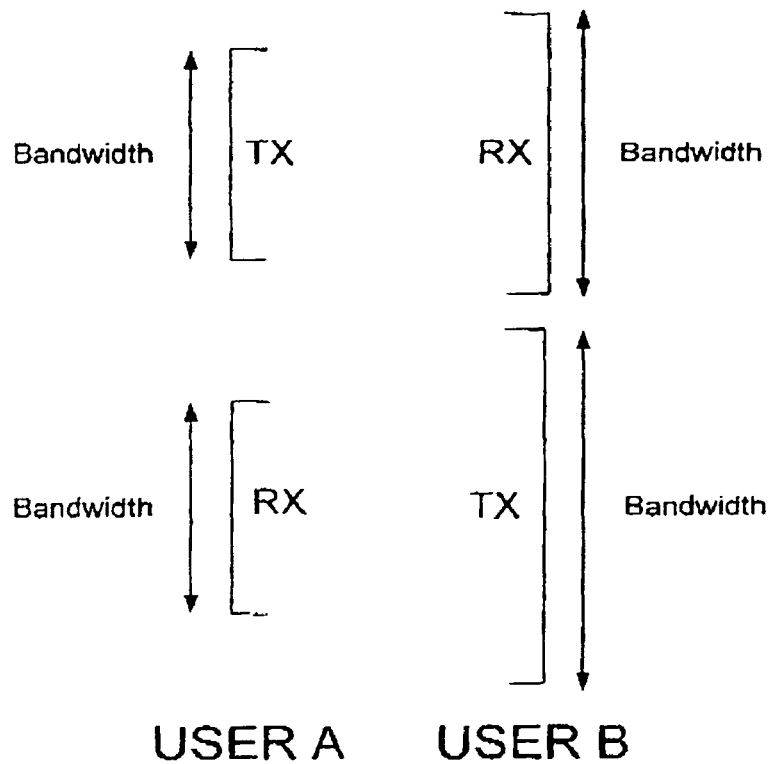
FIG. 2 is an explanatory diagram concerning overlapping receive and transmit bands.

To instigate user discovery, the isolated user 1 deliberately transmits a signal intended to produce interference at any bubbles that may exist in range of the signal, and thus attempts to announce its presence to unknown nodes included in the bubbles. The transmit band supported by the isolated node 1 implicitly alerts only those nodes that are listening on that band. By way of explanation, FIG. 2 shows the alignment of radio frequency communication channels belonging to two nodes A and B. The overlap in the transmit TX and receive RX bandwidths makes two-way communication possible. If an overlap in the receive and transmit frequencies does not exist, then duplex communication is not be possible. Thus, interference at those nodes with which the isolated user 1 cannot communicate is avoided and any nodes subjected to the interference implicitly know which frequency band to use in response.

Figure 3:
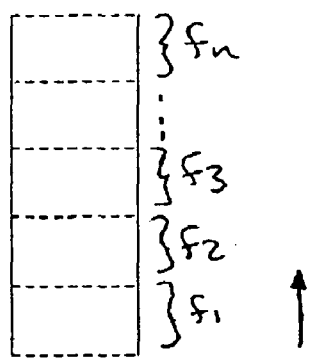
FIG. 3 is an explanatory diagram concerning signal transmission in the communications system shown in FIG. 1.

The isolated user 1 repeatedly passes through the transmit band, transmitting a narrow band signal at different frequencies f1 to fn, as illustrated in FIG. 3. The transmit signal contains the receiver characteristics of the isolated user 1, including information concerning the modulation scheme and coding scheme that it requires in any response sent to it by a node. In parallel to transmitting, the isolated user 1 listens on its receive path for a response indicating that an unknown node has been alerted to its presence.

Figure 4:
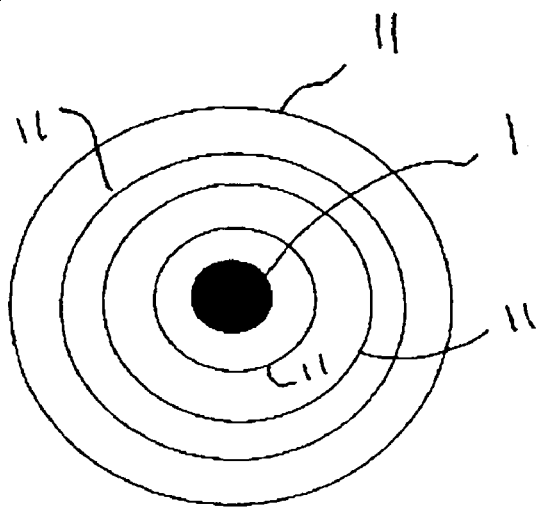
FIG. 4 is a further explanatory diagram concerning the operation of the communications system shown in FIG. 1.

Additionally, each pass through the transmit band by the isolated user 1 is of a higher transmit power than the previous one, as illustrated in FIG. 4, until the maximum transmit power is reached. The central dot represents the isolated node 1 and the concentric circles 11 represent the boundary at which transmitted signals may be received, each circle being representative of a particular power level. Provided an alerted unknown node in one of the bubbles responds in a timely manner, ramping of transmit power in this manner results in spatially localized interference.

Figure 5:
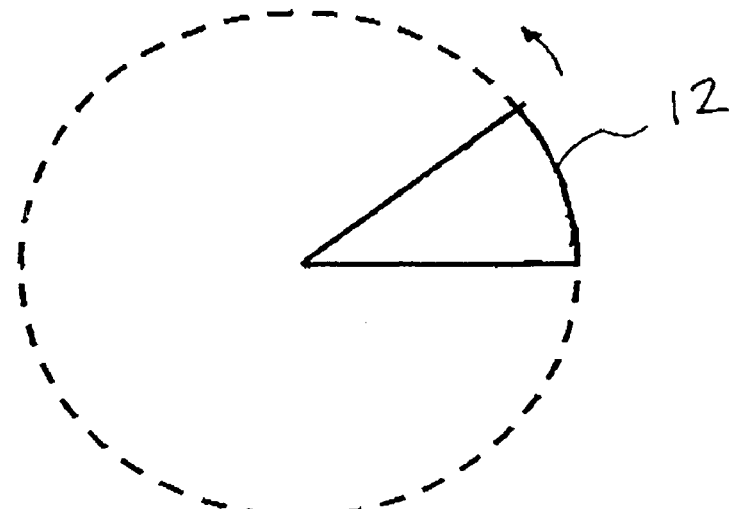
FIG. 5 is another explanatory diagram relating to the operation of the communications system shown in FIG. 1.

Furthermore, as shown in FIG. 5, spatial interference is also focused using steerable antenna technology to direct the transmitted signal 12 in a particular direction rather than omni-directionally. The direction in which the signal is transmitted provides another form of implicit selection. For example, the isolated user 1 may be a sensor node wishing to establish a link with unknown nodes in a particular spatial location. The direction may be fixed, or may be caused to sweep around a circle, as shown by the arrow.

A bubble may be described as "hearing" an isolated user when one or more of the users in the communicating bubble detects the isolated user's presence. The detection may be achieved, for example, by detecting a periodic spike in the receive channel of a node.

In the example shown in FIG. 1, the isolated user 1 transmits a signal as previously described, and nodes 6' and 6" in one group 4, node 5' in group 3, and node 8' in group 7 detect interference produced by the signal. Node 8' does not respond to the isolated user 1 because it is unannounced and not connected to the network 2.

Node 6' detects the presence of the isolated user 1 and transmits the information to the node 6" to which it is connected, and which has a more direct connection with the network 2. The node 6" then sends a response to the isolated user 1 and a first link is established between them when the isolated user 1 receives the response. In addition, the node 5' also establishes a second link with the isolated user 1. The node 6" is a licensed user, enabling it to make use of a licensed part of the wireless spectrum when communicating with the network 2.

The initial links enable radio capabilities and service requirements to be exchanged between the isolated user 1 and the nodes 5' and 6". The nodes 5' and 6" coordinate their shared access of the isolated user 1 interference bands via the IP cloud 2. A standardized protocol coupled with an air interface physical layer of low computational complexity forms the initial communication link, for example, convolution FEC with BPSK modulation. This low-bit rate duplex link is used to communicate the radio capabilities of the isolated user 1 and for the nodes 5' and 6" to respond with a service offer.

The next stage in the bid-offer process, is for the isolated user 1 to establish a more suitable communication link to replace the initial link using a bid-offer procedure. On acceptance of the offer, the isolated user 1 becomes a full member of the announced bubble to which the successful node belongs. Then, the isolated user 1 establishes full communication links with other members of the bubble, adapting to their physical layer parameters and medium access control.

In the case of a simplex radio it is not possible to listen and transmit simultaneously. To cater for this, the isolated node's transmission and reception is time interleaved in a well-defined manner. Upon successful interference injection, the alerted node knows the time of occurrence, the frequency band of occurrence and from the content of the signal received, the isolated node's RX capability. Using this information and a well-defined protocol which describes the interleave pattern, the alerted node can calculate when the isolated node will be listening on each frequency band. The alerted node can then schedule its response.

Figure 6A:
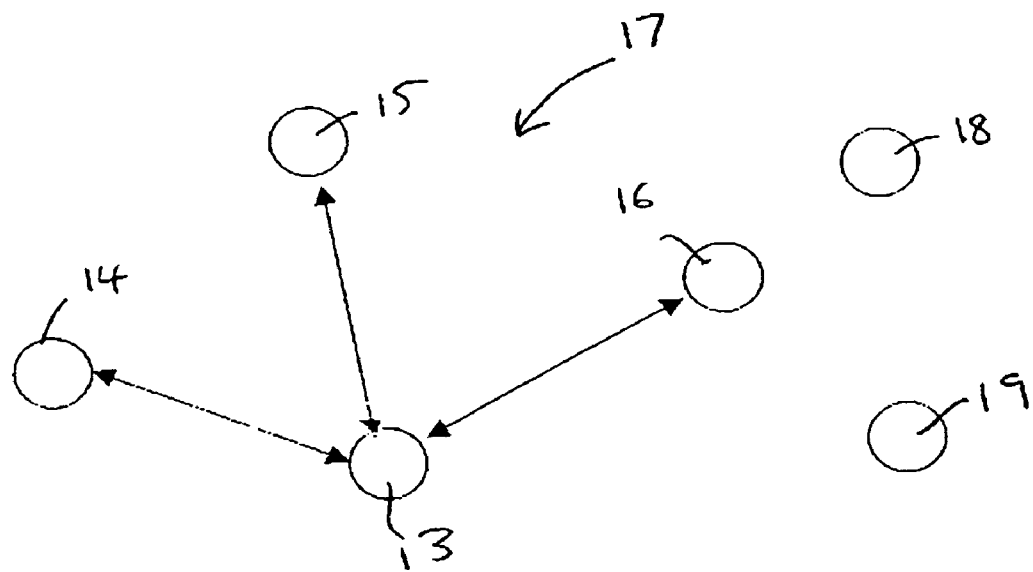
FIGS. 6(a) and (b) schematically illustrates another communications system in accordance with the invention.
Figure 6B:
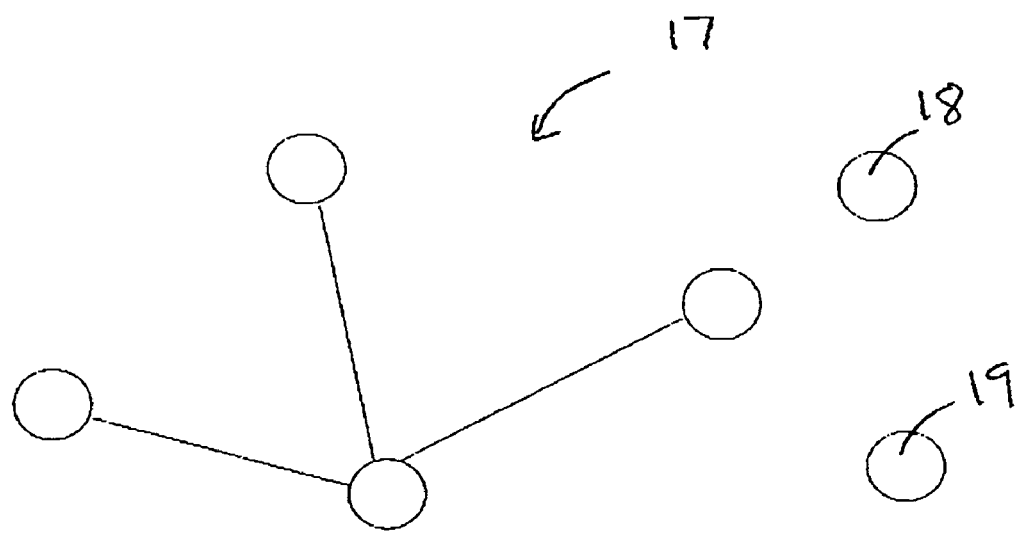

With reference to FIG. 6(*a*), an isolated node 13 transmits a wireless signal to ascertain what other nodes are in its range and which, together with it, may connect to define a network. When the signal is transmitted, it is detected by unknown nodes 14, 15 and 16. In this embodiment, interconnection between the isolated node 13 and a number of unknown nodes is required to build a sufficiently large network. Following establishment of links between the isolated node 13 and unknown nodes 14, 15 and 16, as shown in FIG. 6(*b*), the isolated node has access to the network 17 thereby created. Other nodes 18 and 19 may then join the network 17 by themselves emitting a signal intended to produce interference at an unknown node.

The present invention may be embodied in other specific forms, and implemented by other methods, without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method for wireless access to a network by an isolated user, including the steps of: the isolated user transmitting a wireless signal intended to produce interference at an unknown node; and, upon the such interference being detected by the unknown node, arranging access to the network for the isolated user; and wherein the signal includes information concerning the isolated user's receiver characteristics.

2. The method as claimed in claim 1 and wherein the unknown node is a member of a group of nodes, at least one member of the group having access to the network.

3. The method as claimed in claim 2 and wherein the group includes a plurality of interconnected nodes.

4. The method as claimed in claim 2 and wherein the network is the Internet.

5. The method as claimed in claim 1 and including the step of transmitting the signal at progressively higher transmission strengths.

6. The method as claimed in claim 1 and wherein the isolated user transmits the signal at varying different frequency bands of its transmit band.

7. The method as claimed in claim 1 and wherein the signal is directional.

8. The method as claimed in claim 1 and, when the unknown node detects the interference, the unknown node establishes the receiver characteristic information contained in the signal, the time of occurrence of the interference, and its frequency band, to enable it to respond to the isolated user.

9. The method as claimed in claim 1 and wherein, upon detection by the unknown node, the unknown node requests a second unknown node to respond to the isolated user.

10. The method as claimed in claim 1 and including the step of carrying out a negotiation to select a link to the network if more than one unknown node detects the interference.

11. The method as claimed in claim 10 and wherein the unknown nodes detecting the interference co-ordinate their shared access of the isolated user's receive capacity via the network.

12. The method as claimed in claim 1 and wherein the signal includes modulation scheme information.

13. The method as claimed in claim 1 and wherein the signal includes information identifying which multiple access schemes are available to the isolated user.

14. The method as claimed in claim 1 and wherein at least one of a modulation scheme and a type of multiple access scheme is defined by a standard applicable to a system implementing the method.

15. The method as claimed in claim 1 and wherein the signal includes an identifier related to the isolated user.

16. The method as claimed in claim 1 and including the step of establishing a first transitory link to the network and subsequently establishing a link to the network that more closely meets the isolated user's requirements than the transitory link.

17. The method as claimed in claim 1 and wherein the signal is intended to produce interference during an on-going communication session involving said unknown node.

18. The method as claimed in claim 1 and wherein the isolated user is a mobile user.

19. The method as claimed in claim 1 and including the steps of the isolated user transmitting a series of signals and being in a listening mode between signals included in the series to listen for a response to the transmitted signals.

20. The method as claimed in claim 1 and wherein the isolated user requires access via a licensed spectrum and is unlicensed.

21. The method as claimed in claim 1 and wherein the isolated user and the unknown node together define the network, the network being defined subsequent to the interference being detected by the unknown node.

22. The method as claimed in claim 21 and wherein, when more than one unknown node detects the interference, the network includes the isolated user and a plurality of unknown nodes.

23. A communications system comprising a plurality of groups of connected nodes, at least one member of each group having access to a common network, and wherein at least one member of each group includes a detector to detect interference arising from a signal transmitted by an isolated user requiring access to the network and to detect characteristics of the isolated user to enable a link to be established between the isolated user and the network.

24. The system as claimed in claim 23 and wherein the isolated user requires access via a licensed spectrum and is unlicensed.

* * * * *